United States Patent
Salvo et al.

(10) Patent No.: US 9,235,499 B2
(45) Date of Patent: Jan. 12, 2016

(54) SYSTEM AND METHOD FOR IDENTIFYING A CHARACTER-OF-INTEREST

(75) Inventors: Joseph Salvo, Schenectady, NY (US); John Carbone, Ballston Spa, NY (US); Lynn Ann Derose, Gloversville, NY (US); Adam McCann, Clifton Park, NY (US); William Leonard, Saratoga Springs, NY (US)

(73) Assignee: General Electric Company, Schnectady, NY (US)

( * ) Notice: Subject to any disclaimer, the term of this patent is extended or adjusted under 35 U.S.C. 154(b) by 1061 days.

(21) Appl. No.: 13/328,659

(22) Filed: Dec. 16, 2011

(65) Prior Publication Data

US 2013/0159660 A1  Jun. 20, 2013

(51) Int. Cl.
| | |
|---|---|
| *G06K 9/46* | (2006.01) |
| *G06F 12/02* | (2006.01) |
| *G06F 15/00* | (2006.01) |
| *G06F 17/30* | (2006.01) |
| *G06K 9/00* | (2006.01) |
| *G06K 9/50* | (2006.01) |

(52) U.S. Cl.
CPC ............. *G06F 12/02* (2013.01); *G06F 15/00* (2013.01); *G06F 17/30* (2013.01); *G06K 9/00973* (2013.01); *G06K 9/50* (2013.01); *G06K 2209/01* (2013.01)

(58) Field of Classification Search
USPC .......................................................... 382/192
See application file for complete search history.

(56) References Cited

U.S. PATENT DOCUMENTS

| | | | | |
|---|---|---|---|---|
| 4,482,958 A | * | 11/1984 | Nakayama | ............ G06T 11/006 378/14 |
| 4,589,140 A | | 5/1986 | Bishop | |
| 5,041,912 A | * | 8/1991 | Schlig | ....................... G06T 5/20 382/262 |
| 5,113,507 A | | 5/1992 | Jaeckel | |
| 5,712,922 A | | 1/1998 | Loewenthal | |
| 5,828,769 A | | 10/1998 | Burns | |
| 5,829,009 A | * | 10/1998 | Frazier | .................... G06F 12/02 707/E17.035 |
| 5,893,668 A | | 4/1999 | Harrison | |

(Continued)

OTHER PUBLICATIONS

Larry M. Manevitz and Yigal Zemach, "Assigning meaning to data: Using sparse distributed memory for multilevel cognitive tasks," Neurocomputing, Jan. 1997, vol. 14 Issue: 1, pp. 15-39.

(Continued)

*Primary Examiner* — Kathleen Y Dulaney
(74) *Attorney, Agent, or Firm* — Dean D. Small; The Small Patent Law Group, LLC

(57) ABSTRACT

A method of generating an output vector to identify a character-of-interest using a sparse distributed memory (SDM) module. The method includes obtaining a feature vector having a vector address. The feature vector is based on a character-of-interest in an acquired image. The method also includes identifying activated locations from hard locations by determining relative distances between the vector address and the stored vector location addresses. Stored content counters of the activated locations include first and second stored sub-sets of counters. The method also includes combining the counters of the first stored sub-sets of the activated locations using a first summation thread to provide a first combined sub-set of values. The method also includes combining the counters of the second stored sub-sets of the activated locations using a second summation thread to provide a second combined sub-set of values. The first and second summation threads are run in parallel.

14 Claims, 8 Drawing Sheets

(56) References Cited

U.S. PATENT DOCUMENTS

| | | | |
|---|---|---|---|
| 6,088,490 A * | 7/2000 | Iwata | G06T 1/20 382/312 |
| 6,122,317 A * | 9/2000 | Hanami | H04N 19/56 348/699 |
| 6,244,764 B1 | 6/2001 | Lei | |
| 6,269,376 B1 | 7/2001 | Dhillon | |
| 6,392,747 B1 | 5/2002 | Allen | |
| 6,899,275 B2 | 5/2005 | Schramm | |
| 7,512,572 B2 | 3/2009 | Furber | |
| 7,840,914 B1 | 11/2010 | Agarwal | |
| 7,860,313 B2 | 12/2010 | Walch | |
| 7,912,283 B1 | 3/2011 | Repperger | |
| 7,966,274 B2 * | 6/2011 | Adams | G06K 9/6253 382/159 |
| 2002/0039444 A1 * | 4/2002 | Yamagata | H04N 1/40062 382/199 |
| 2002/0129070 A1 * | 9/2002 | Mallinson | H03H 15/00 708/5 |
| 2004/0114831 A1 * | 6/2004 | Notovitz | G06K 9/3283 382/296 |
| 2004/0183930 A1 * | 9/2004 | Masuyama | H04N 5/347 348/294 |
| 2007/0263930 A1 | 11/2007 | Ito | |
| 2009/0003722 A1 | 1/2009 | Nadabar | |
| 2009/0016600 A1 | 1/2009 | Eaton | |
| 2009/0272812 A1 | 11/2009 | Marty | |
| 2010/0188710 A1 | 7/2010 | Fan | |
| 2010/0241745 A1 | 9/2010 | Offen | |
| 2010/0312731 A1 | 12/2010 | Knoblauch | |
| 2010/0327060 A1 | 12/2010 | Moran | |

OTHER PUBLICATIONS

Kuo-Chin Fan, and Yuan-Kai Wang, "A genetic sparse distributed memory approach to the application of handwritten character recognition," Pattern Recognition, vol. 30, Issue: 12, pp. 2015-2022, 1997.

Hong and Chen, "Character recognition in a sparse distributed memory," IEEE Transactions on Systems, Man and Cybernetics, May/Jun. 1991, vol. 21, Issue: 3, pp. 674-678.

Flynn et al, "Sparse Distributed Memory: Principles and Operation," Technical Report CSL-TR-89-400, Dec. 1989.

Ma et al. "A New Algorithm for Character Segmentation of License Plate Based on Variance Projection and Mean Filter". 2011 IEEE 5th Conference on Cybernetics and Intelligent Systems.

Lee et al. "A New Methodology for Grey-Scale Character Segmentation and Recognition". 0-8186-7128-9/95. IEEE 1995.

* cited by examiner

SYSTEM AND METHOD FOR IDENTIFYING A CHARACTER-OF-INTEREST

BACKGROUND

A variety of items used in commerce include machine-readable markings that provide information about the items. The information may not only be used to determine a price of the item (e.g., when checking out at a supermarket) as in some cases, but can also be used to determine a production/usage history of an item (e.g., lot number, date of manufacture, and period of use). Items are often labeled with removable tags, or containers that hold the items can be labeled. In some instances, the markings are physically part of the item. For example, an automotive part can be directly marked through dot peening, etching, hammering, molding, casting, and the like.

Items that are directly marked may be exposed to conditions that are capable of damaging the physical markings. For example, a machine part may be used and then refurbished for a second lifetime of use. However, during use of the machine part or during the refurbishing process, the markings may become scratched, worn, soiled, or otherwise rendered more difficult to read. In some cases, if any one of the characters is unreadable for an individual or scanner, the part may be required to undergo more extensive analysis to identify the part or it may even be scrapped completely.

Regardless of how the items are marked, character-recognition systems can be memory intensive and take a substantial amount of time to identify the characters. If the markings have been rendered more difficult to read, character-recognition systems can be unreliable and provide incorrect information.

BRIEF DESCRIPTION

In accordance with various embodiments, a non-transitory computer readable medium is provided that is configured to generate an output vector for identifying a character-of-interest using a processor and a sparse distributed memory (SDM). The SDM includes an address space having hard locations. The hard locations have a stored vector location address and stored content counters. The computer readable medium includes instructions to command the processor to obtain a feature vector having a vector address. The feature vector is based on a character-of-interest in an acquired image. The processor is also commanded to identify activated locations from the hard locations by determining relative distances between the vector address and the stored vector location addresses. The stored content counters of the activated locations include first and second stored sub-sets of counters. The processor is also commanded to combine the counters of the first stored sub-sets of the activated locations using a first summation thread to provide a first combined sub-set of values. The processor is also commanded to combine the counters of the second stored sub-sets of the activated locations using a second summation thread to provide a second combined sub-set of values. The first and second summation threads are run in parallel. The processor is also commanded to generate an output vector that includes a set of coordinates comprising first and second output sub-sets. The first and second output sub-sets are based on the first and second combined sub-sets, respectively.

In accordance with other various embodiments, a character-recognition system is provided that includes a vector-generating module that is configured to obtain image data relating to an acquired image of an object. The object has a character-of-interest on a surface thereof. The vector-generating module generates a feature vector based on the character-of-interest. The feature vector has a vector address. The system also includes an output-generating module that is configured to generate an output vector using a sparse distributed memory (SDM). The SDM includes an address space having hard locations. The hard locations have a stored vector location address and stored content counters. The output-generating module is configured to identify activated locations from the hard locations by determining relative distances between the vector address and the stored vector location addresses. The stored content counters of the activated locations include first and second stored sub-sets of counters. The output-generating module is also configured to combine the counters of the first stored sub-sets of the activated locations using a first summation thread to provide a first combined sub-set of values and combine the counters of the second stored sub-sets of the activated locations using a second summation thread to provide a second combined sub-set of values. The first and second summation threads are run in parallel. The output-generating module is also configured to generate an output vector that includes a set of coordinates comprising first and second output sub-sets. The first and second output sub-sets are based on the first and second combined sub-sets, respectively.

In accordance with yet other various embodiments, a method of generating an output vector to identify a character-of-interest using a processor and a sparse distributed memory (SDM) is provided. The SDM includes an address space having hard locations. The hard locations include a stored vector location address and stored content counters. The method includes obtaining a feature vector having a vector address. The feature vector is based on a character-of-interest in an acquired image. The method also includes identifying activated locations from the hard locations by determining relative distances between the vector address and the stored vector location addresses. The stored content counters of the activated locations include first and second stored sub-sets of counters. The method also includes combining the counters of the first stored sub-sets of the activated locations using a first summation thread to provide a first combined sub-set of values. The method also includes combining the counters of the second stored sub-sets of the activated locations using a second summation thread to provide a second combined sub-set of values. The first and second summation threads are run in parallel. The method also includes generating an output vector that includes a set of coordinates comprising first and second output sub-sets. The first and second output sub-sets being based on the first and second combined sub-sets, respectively.

DETAILED DESCRIPTION

Figure 1:
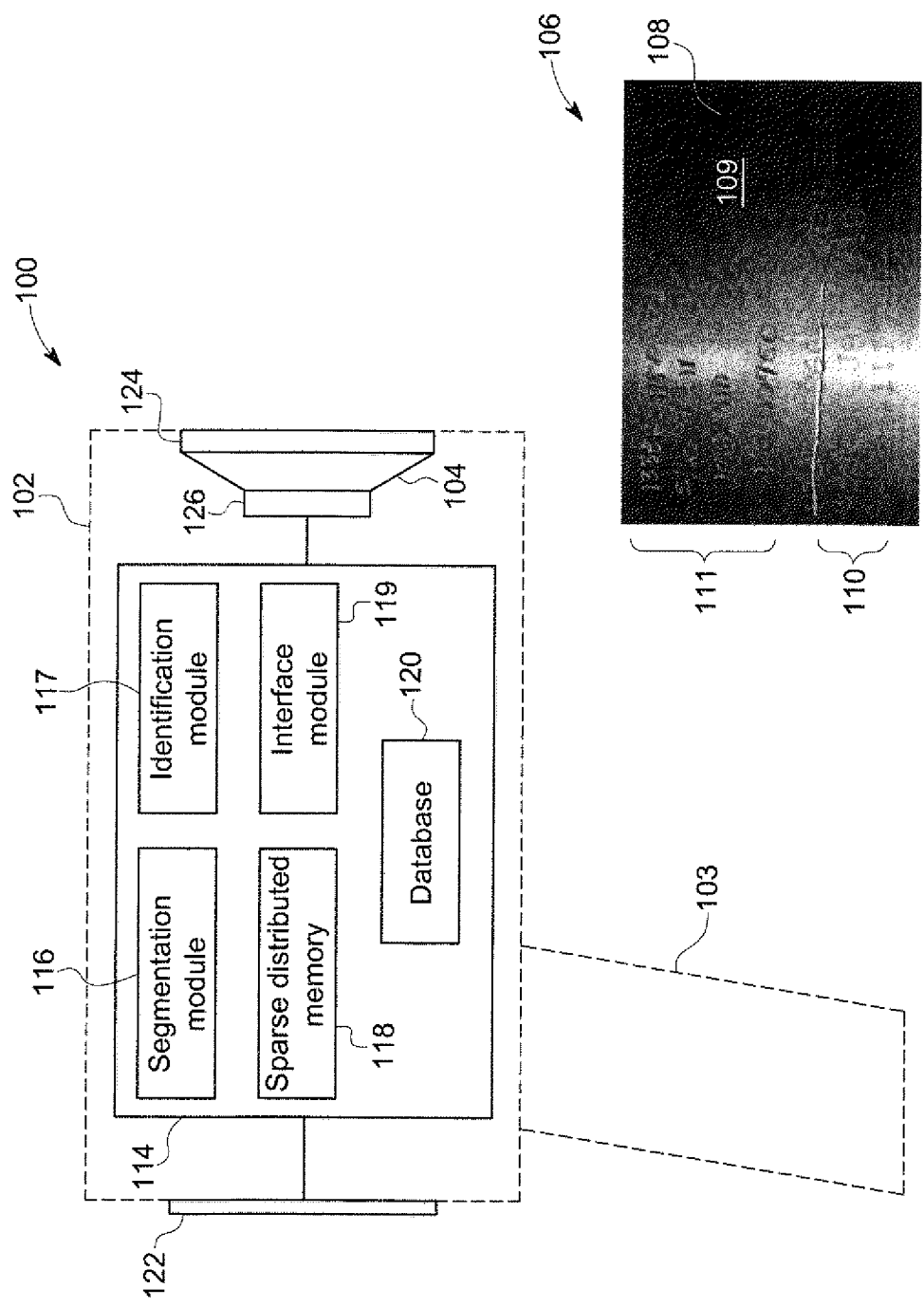
FIG. 1 is a schematic block diagram that illustrates an exemplary character-recognition system formed in accordance with one embodiment.

The following detailed description of certain embodiments will be better understood when read in conjunction with the appended drawings. To the extent that the Figures illustrate diagrams of functional blocks of various embodiments, the functional blocks are not necessarily indicative of the division between hardware. Thus, for example, one or more of the functional blocks may be implemented in a single piece of hardware or multiple pieces of hardware. It should be understood that the various embodiments are not limited to the arrangements and instrumentality shown in the drawings. Additionally, the system blocks in the various Figures or the steps of the methods may be rearranged or reconfigured.

As used herein, an element or step recited in the singular and proceeded with the word "a" or "an" should be understood as not excluding plural of said elements or steps, unless such exclusion is explicitly stated. Furthermore, references to "one embodiment" or "an exemplary embodiment" and the like are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

FIG. 1 schematically illustrates an exemplary character-recognition system (or reader) 100 formed in accordance with one embodiment. The system 100 is configured to analyze an image of a surface of an object that has markings that include characters or symbols thereon and provide an indication or estimation as to the identity of a character(s)-of-interest. The system 100 may also be configured to acquire the image of the surface of the object. Although not required, at least one of the characters-of-interest may be difficult to read by an individual or conventional reader system. For instance, the characters-of-interest may be scratched, chipped, dirtied, improperly printed, have a small type-font, or are otherwise difficult to read.

In various embodiments, the markings are configured to identify and/or provide information about the object that has the markings. For example, the markings can be used to determine any information about the manufacture or subsequent use of the object, such as a date of production, the particular manufacturer or plant that made the object, composition of the material(s) used, when and by whom the object was inspected, when and how long the object was used, the machine that used the object, and the like.

Embodiments described herein may be used to analyze imaged markings on an object. The imaged markings may include characters or symbols that are part of an identification system. In particular embodiments, the markings are physical markings. As used herein, "physical markings" include markings that are at least partially made by morphological changes along the surface of the object. As opposed to two-dimensional markings made on paper, physical markings may be three-dimensional. For example, objects described herein may have physical markings that were formed by changing a relatively smooth, surface through dot peening, etching, hammering, scratching, stamping, impressing, and the like. Physical markings may also be made through molding, casting, and the like in which, for example, a material is poured into a mold and allowed to cure, set, or otherwise harden. The above examples are not intended to be limiting and as such, physical markings could be made through other processes. Moreover, the use of the term "markings" is not intended to be limited to a particular language or identification system. For example, the markings may include letters of a recognizable language and numbers (i.e., alphanumeric characters). The markings may also include other recognizable symbols (e.g., Greek symbols) or symbols specifically designed for a particular identification system.

An object may include more than one type or style of marking. For example, at least one of the physical markings may be cast or molded by the manufacturer while other markings may be dot peened by the vendor or user of the object. The physical markings may be located on a planar surface or a surface that has some curvature or contour.

Although embodiments described herein are described with particular reference to physical markings, other embodiments may be used to image and analyze two-dimensional markings. For example, the imaged markings could be made by applying ink or paint to cardboard containers, envelopes, paper, or other substantially planar surfaces. As such, when the terms "markings," "characters," or "characters-of-interest" are not modified by "physical," the term includes two-dimensional markings, characters, etc.

The objects imaged may be any item capable of having the markings made thereon. In particular embodiments, the object is a mechanical item configured to be used in a machine or other industrial application in which the object has physical markings on surface(s) of the object. For example, the objects could be automotive parts or aircraft parts (e.g., rotors). The objects can be large and heavy such that the objects must be scanned one at a time by an individual. The objects can also be small, such as items used with handheld electronic devices. The objects can also be found or used in environments that increase the likelihood of the physical markings being damaged or dirtied.

With respect to FIG. 1, the system 100 may include various components, assemblies, and systems (including sub-systems) that interact with each other to provide a suggested identity of a character(s)-of-interest. The system 100 may also be configured to acquire images that include the character(s)-of-interest. For example, the system 100 may include an imager 104 that is configured to capture one or more images 106 of the markings 110, 111 on an object 108. The object 108 has a surface 109 with a small, convex curvature. As shown in the exemplary image 106, the markings 110, 111 include physical markings 110 that are dot-peened onto the surface 109 and physical markings 111 that are scratched by an individual or machine-penned onto the surface 109. Other physical markings can be cast or molded with the object 108 during manufacture.

In the illustrated embodiment, the system 100 may include a single housing 102 that is configured to hold the imager 104 and other components of the system 100. The housing 102 may be sized and shaped for an individual to hold and carry and may include a grip 103. In such embodiments, the system 100 may resemble a handheld price scanner. Alternatively, the system 100 and the housing 102 are not sized for an individual to carry. By way of one example only, the system 100 could be a part of an assembly line or other automated system in which the objects are imaged as the objects pass by on a conveyor belt. The alternative system 100 could have a stationary position with respect to the conveyor belt.

The imager 104 may include a lens or lenses 124 and an imaging sensor 126 configured to acquire the images 106.

The imaging sensor can be a charge-coupled device (CCD), a complimentary metal oxide semiconductor (CMOS), or another type of imaging sensor. The imager 104 may include other features that may be used with imagers/cameras, such as an auto-focus mechanism, viewfinder, and/or a lighting system that is configured to illuminate the surface 109 of the object 108 during acquisition of the image 106. As shown, the system 100 may also include a user interface 122 that may receive user inputs from the user and/or communicate information to the user. For instance, the user interface 122 may include a display that identifies the objects scanned by the system 100 or provides suggested identities of the characters-of-interest and/or the objects. As used herein, providing a "suggested identity" and like terms may include providing an ideal character (e.g., the letter or number without any noise) or may include providing a closer estimation of how the character-of-interest should appear, which may include some noise. In some embodiments, the user can enter information or instructions to assist the system 100 in identifying the characters-of-interest.

As shown in FIG. 1, after acquiring the image 106, data representing the image 106 may be communicated to a system controller 114. The system controller 114 may include one or more processors or modules, illustrated as modules 116-120, that communicate directly or indirectly with one another. The system controller 114 is illustrated conceptually as a collection of modules, but may be implemented utilizing any combination of dedicated hardware boards, DSPs, processors, and the like. The system controller 114 can also be implemented utilizing an off-the-shelf PC with a single processor or multiple processors, with the functional operations distributed between the processors. The modules described herein also may be implemented utilizing a hybrid configuration in which certain modular functions are performed utilizing dedicated hardware, while the remaining modular functions are performed utilizing an off-the-shelf PC and the like. The modules also may be implemented as software modules within a processing unit or system memory.

The modules 116-120 include a segmentation module 116, an identification module 117, a sparse distributed memory (SDM) 118, an interface module 119, and a database 120. The segmentation module 116 is configured to analyze the image 106 and convert at least a portion of the markings 110-112 into a corresponding feature vector (described in greater detail below). For example, in some embodiments, the segmentation module 116 separates the image into portions to isolate characters-of-interest. The portions of the image 106 may then be converted into pixel (e.g., binary) images and analyzed to generate corresponding feature vectors. The segmentation module 116 may also be part of or include a vector-generating module, such as the vector-generating module 260 described below with reference to FIG. 7. The identification module 117 is configured to receive the feature vector and, for at least one of the characters-of-interest, use the SDM module 118 to identify the character(s)-of-interest. The identification module 117 may also be part of or include an output-generating module, such as the output-generating module 262 described below with reference to FIG. 7. The interface module 119 may be configured to communicate with the other modules 116-118, 120 and the user interface 122.

As will be described in greater detail below, embodiments described herein may be capable of parallel computing or processing in which multiple threads operate over at least partially overlapping time periods (e.g., at least partially simultaneously). For example, while a first thread may be processing values according to a predetermined algorithm, a second thread may also be processing values according to the same or similar algorithm. The first and second threads may also operate pursuant to different algorithms. By way of example only, parallel processing may be used to generate a feature vector, train or update the SDM, and/or provide an output vector. Parallel processing may also be used in converting the acquired image 106 to pixel images and/or providing an image with a suggested identity to the user.

The parallel computing may be accomplished by separate processing elements. The memory (e.g., SDM) may be either shared by the multiple processing elements in a single address space, or each processing element may have a portion of the address space. Other architectures/configurations may be used, such as distributed share memory architectures and memory virtualization. As one example of a system that uses parallel computing, a single handheld device may have a multi-core processor with multiple processing elements. The first thread may be executed on a first processing element and the second thread may be executed on a second processing element. In other embodiments, the multiple processing elements may be found across multiple machines or systems. As such, in alternative embodiments, the system 100 may include a collection of machines or systems.

Figure 2:
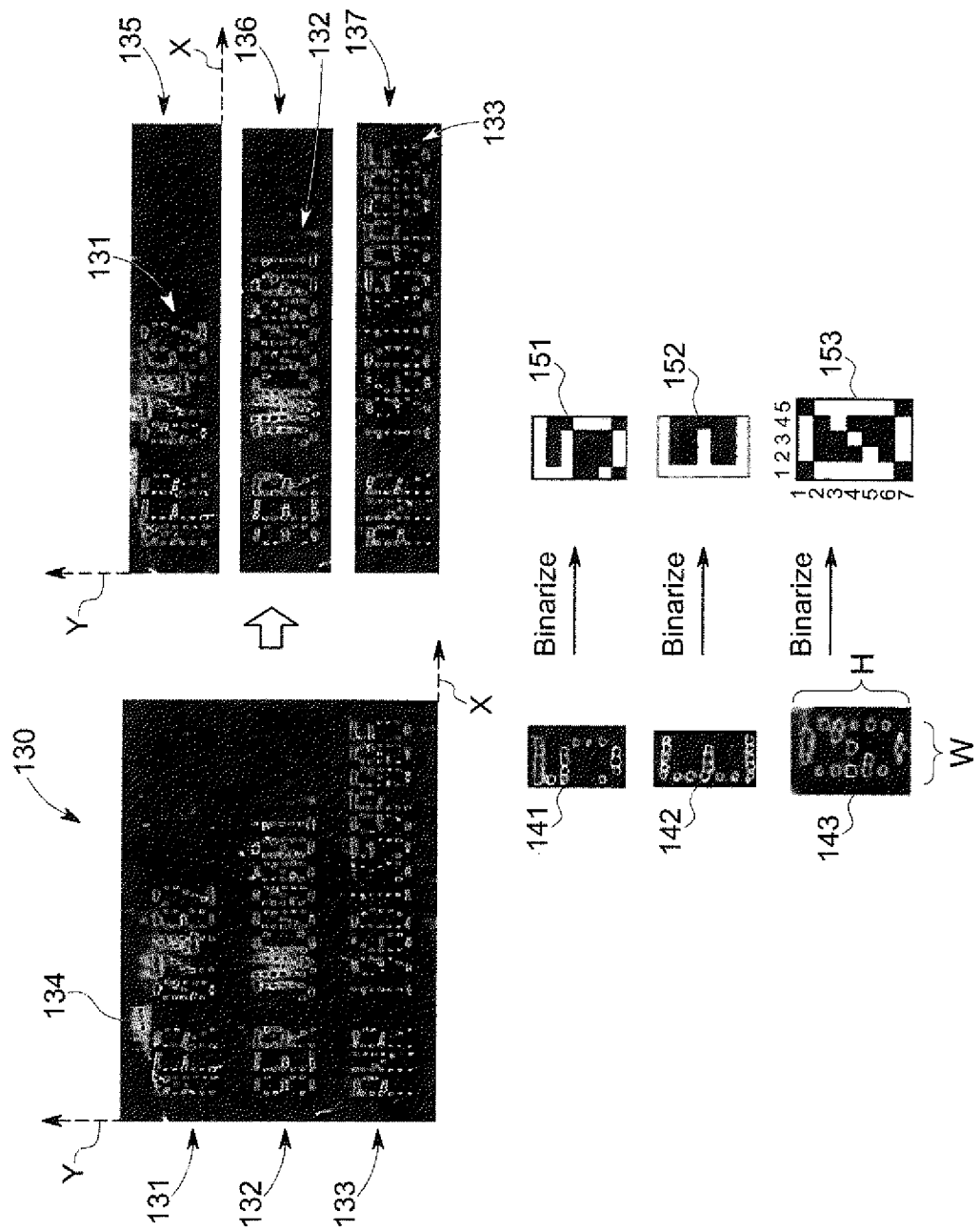
FIG. 2 illustrates segmentation and conversion of an acquired image into pixel images by the system of FIG. 1.
Figure 3:
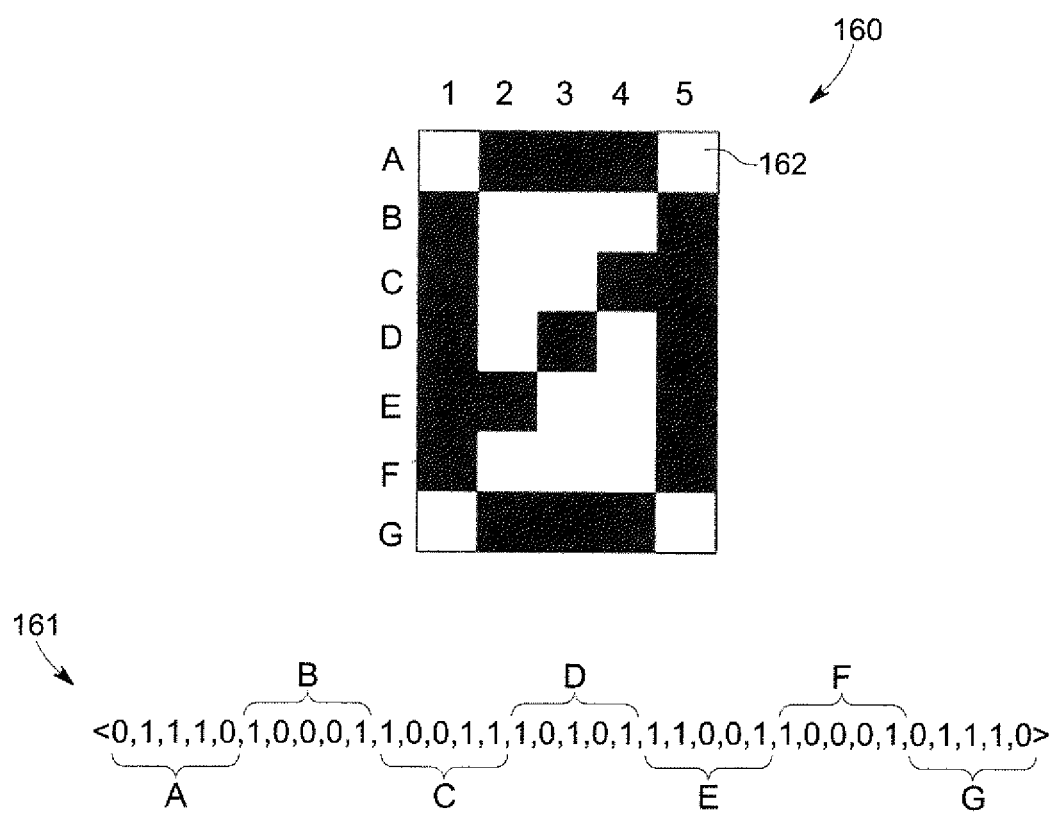
FIG. 3 illustrates a pixel image and a corresponding feature vector that is converted from the pixel image by the system of FIG. 1.

FIGS. 2 and 3 illustrate conversion of an enhanced image 130 (FIG. 2) into pixel or binary images 151-153 (FIG. 2) or 160 (FIG. 3) that are then converted into feature vectors 161 (FIG. 3). The enhanced image 130 may be based on an acquired image, such as the image 106 (FIG. 1), that has been processed to enhance the physical markings along the surface of the object. The enhanced image 130 could have, among other things, an increased contrast. In other embodiments, the acquired image 106 is not enhanced prior to conversion of the image 106 into the pixel images 151-153, 160 and/or into the feature vectors 161.

The physical markings shown in the image may include the characters-of-interest as well as other unwanted physical changes, such as any unintended scratches or unwanted dirt that may have collected onto the surface. For example, the enhanced image 130 shown in FIG. 2 includes three separate character lines 131-133 of individual characters. A character line includes a series of characters-of-interest that are substantially aligned along a portion of the corresponding image. The enhanced image 130 also includes a scratch 134 that extends across the surface near the character line 131. As shown, some of the characters-of-interest or portions thereof may be brighter or darker than others in the enhanced image 130. The brighter portions may correspond to regions of the surface that are physically changed more than other regions of the surface. For example, the brighter portions may correspond to regions that are more indented than other regions.

The segmentation module 116 can be configured to separate the enhanced image 130 to isolate the characters-of-interest. In some embodiments, the segmentation module 116 may separate the enhanced image 130 into line sections 135-137, respectively, as shown in FIG. 2. Each of the line sections 135-137 includes one of the character lines 131-133. As one example of separating the enhanced image 130, the segmentation module 116 may scan a Y-axis of the enhanced image 130 and analyze a total signal in a direction along an X-axis. For those portions along the scan that are below a threshold, the enhanced image 130 can be separated or segmented to provide, for example, the line sections 135-137. After separating the line sections 135-137, the segmentation module 116 may perform a similar analysis for each of the line sections 135-137. For example, with respect to the line section 135, the segmentation module 116 may scan along the X-axis and analyze a total signal in a direction along the Y-axis. For those portions along the scan that are below a threshold or predetermined value, the line section 135 may be segmented to provide individual character images 141-143 of the enhanced image 130. In an exemplary embodiment, the character images 141-143 include a single character-of-interest. However, in other embodiments, the character images 141-143 can include more than one character-of-interest.

The segmentation module 116 may also be configured to convert the character images 141-143 into the binary images 151-153. In some embodiments, the segmentation module 116 scans along the X and Y-axes of each of the character images 141-143 to determine dimensions of the character-of-interest within the corresponding character image and remove extraneous portions. For example, the segmentation module 116 may determine a height H and width W of the character-of-interest in the character image 143 (i.e., the number zero) and remove outer portions of the character image 143 that surround the character-of-interest thereby providing an edge-enhanced character image (not shown).

The segmentation module 116 may then analyze separate blocks or cells of the edge-enhanced character image to pixelize (or binarize) the image. By way of example only, the segmentation module 116 may compare an intensity signal of each of the cells to a predetermined threshold. If the intensity signal of the corresponding cell exceeds the threshold, the cell is labeled as having a first value (e.g., 1). If the intensity signal of the corresponding cell is less than the threshold, the cell is labeled as having a different second value (e.g., 0). If the intensity signal is equal to the threshold, the cell can be labeled as having the first or second value. As shown in FIG. 2, the binary images 151-153 are 5×7 matrices of cells. Hence, the binary images 151-153 have 35 cells in the illustrated embodiment. In other embodiments, the binary images may have less than about 60 cells or less than about 100 cells. However, in other embodiments, the binary images have more than about 100 cells.

Although the pixelization process described above labels each cell as having only one of two cell values, other pixelizing processes may use a different number of cell values (e.g., 1 of N values). For example, there can be three possible cell values depending upon the intensity signal of the cell. Moreover, the pixelization process can be modified in other manners if desired. For example, instead of only considering the intensity signal of the corresponding cell, the intensity signals of adjacent cells may be considered when assigning a cell value.

FIG. 3 shows an exemplary binary image 160 having an array of cells 162. The segmentation module 116 may also be configured to convert binary (or pixel) images into feature vectors. As such, the segmentation module 116 may also be referred to as a vector-generating module. As shown in FIG. 3, the array of cells 162 are arranged in rows A-G and columns 1-5, but other arrangements may be used. Each cell 162 has a cell location and a cell value. With respect to FIG. 3, the binary image 160 may be converted by the segmentation module 116 into a feature vector 161. The feature vector 161 is illustrated as including a string or set of 1's and 0's. In some embodiments, the segmentation module 116 analyzes each row of cells 162 in the binary image 160. Alternatively, the segmentation module 116 may analyze each column of cells 162.

Each cell 162 has a cell location (or address) that can be defined by the row and column of the cell 162. As shown, row A includes cells that exceeded the predetermined threshold as discussed above (indicated in black) and also cells that did not exceed the threshold (indicated in white). Specifically, cell A1 has a cell value of 0; cell A2 has a cell value of 1; cell A3 has a cell value of 1; cell A4 has a cell value of 1; and cell A5 has a cell value of 0. Rows B-G have cells 162 with cell values as indicated. As shown in the feature vector 161, the string of cell values in the feature vector is based on the cell locations and the values of the cells. As such, the cell values may be referred to as coordinates in the feature vector. For example, the first three coordinates in the feature vector 161 have values that are derived from the cells A1, A2, A3 . . . and the last three coordinates have values that are derived from the cells G3, G4, G5.

In some SDM algorithms used in various embodiments, the feature vector (or input vector) includes both a vector address and a data pattern. In some embodiments, the vector address and/or the data pattern of the feature vector 161 is based upon (a) the cell locations and (b) the values of the cells. In an exemplary embodiment, the vector address of the feature vector 161 and the data pattern of the feature vector 161 are the same. This may be referred to as the autoassociative mode. Although the illustrated embodiment uses an autoassociative protocol, other embodiments may have different values representing the vector address and the data pattern. For example, the vector address may be a three-digit number and the data pattern may be the same as shown in FIG. 3.

Figure 4:
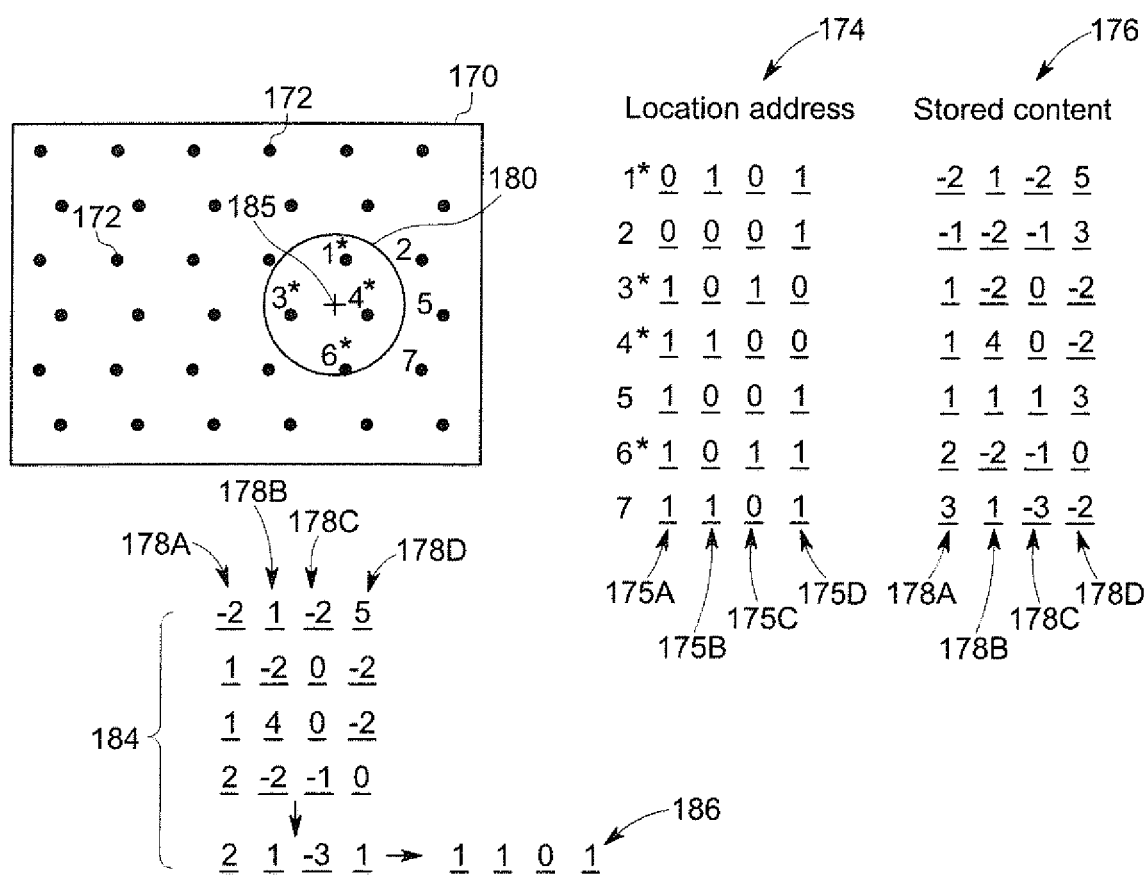
FIG. 4 illustrates training a sparse distributed module (SDM) and/or providing a suggested identity of a character-of-interest using the system of FIG. 1.

FIG. 4 illustrates how the system 100 may provide a suggested identity of a character-of-interest. FIG. 4 includes a representative view of the SDM module 118, which includes an address space 170 (only a portion of which is shown in FIG. 4). The address space 170 is at least partially based on the number of coordinates in the feature vector 161. In some embodiments, the address space 170 may be based on a total number of possible vector addresses. For example, the feature vector 161 includes a set of thirty-five (35) coordinates, wherein each coordinate has a possible value of 0 or 1. Thus, the total number of possible vector addresses in this example is $2^{35}$ or approximately 35 billion addresses.

As shown in FIG. 4, the address space 170 has a plurality of hard locations 172 that are distributed within the address space 170. The hard locations 172 may be used to identify the character(s)-of-interest based on the sparse distributed memory techniques described herein. A total number of hard locations 172 can be relatively small or sparse compared to the total number of possible addresses. For example, the address space 170 may have 1.4 million hard locations 172 out of a total of approximately 35 billion locations in the address space 170. Each of the hard locations 172 has a stored vector location address 174 of the address space 170 and stored content counters 178. In an exemplary embodiment, the hard locations 172 are evenly distributed throughout the address space 170. However, in alternative embodiments, the hard locations 172 may be modified such that the hard locations 172 are not evenly distributed throughout the address space 170. The stored vector location address 174 of each hard location 172 may have the same number of coordinates 175 of the feature vector 161. However, for illustrative purposes in FIG. 4, the stored vector location address 174 of each hard location 172 has only four coordinates 175A-175D. The stored content counters 178A-178D include a number of counters that equals the number of coordinates 175 in the hard location 172 and in the feature vector 161. Again, for illustrative purposes, only four counters 178A-178D are shown in FIG. 4 for each hard location 172.

In some embodiments, the system 100 is configured to train the SDM module 118. Alternatively, a previously trained or modified SDM module 118 may be provided to the system 100. To train the SDM module 118, the system 100 may scan numerous objects (e.g., tens or hundreds) having markings thereon and convert the markings into feature vectors as described above. The feature vectors may then be written or stored into the SDM module 118 to train the SDM module 118 in identifying characters-of-interest. More specifically, the identification module 117 may determine a relative distance between the vector address of the feature vector 161 and at least some of the stored vector location addresses 174 of the hard locations 172. In some embodiments, the identification module 117 determines a relative distance between the stored vector address of the feature vector 161 and each one of the stored vector location addresses 174 of the hard locations 172. By way of illustration, the vector address of the feature vector to-be-stored, such as the feature vector 161, is represented in the address space 170 as cross-hairs 185. As shown, the cross-hairs 185 are located relatively close to the hard locations 172 that are indicated as numbers (nos.) 1, 3, 4, and 6 in the address space 170.

The identification module 117 may determine the relative distance between the feature vector to-be-stored and the hard locations 172 using various algorithms. The relative distance may be determined by calculating, for example, the Hamming distance between the feature vector to-be-stored and one of the hard locations 172. Other exemplary algorithms for calculating the relative distances include the Manhattan distance and the Euclidean distance. The Hamming distance essentially determines the number of coordinates in the feature vector to-be-stored that have a different value than the corresponding coordinates 175 of the stored location address of each of the hard locations 172. Using the hard locations 172 as an example of calculating the Hamming distance, the Hamming distance between the hard location no. 1 and hard location no. 2 is 1 unit, because the hard locations nos. 1 and 2 only differ at the second coordinate 175B. The relative distance between the hard location no. 1 and the hard location no. 3 is 4 units, because the hard locations nos. 1 and 3 differ at all four coordinates 175A-175D.

The identification module 117 may then compare the calculated relative distance associated with the hard locations 172 to a predetermined distance or threshold value. The circle 180 that surrounds the hard locations nos. 1, 3, 4, and 6 in FIG. 4 may represent the predetermined distance value. The hard locations 172 that are within the predetermined distance (i.e., the hard locations nos. 1, 3, 4, and 6) are considered to be "activated" and, as such, those hard locations 172 may be referred to as activated locations. The activated locations are indicated with asterisks in FIG. 4.

After identifying the activated locations from the hard locations 172, the data pattern of the queried feature vector can then be stored into the stored content counters 178 for those hard locations 172 that are activated. For example, the stored content counters 178 may be incremented and/or decremented. Each counter 178A-178D corresponds to one of the coordinates (e.g., the counter 178A corresponds to the coordinate 175A, the counter 178B corresponds to the coordinate 175B, and so on). According to one embodiment, for each coordinate in the feature vector to-be-stored that has a value of 1, the corresponding counter 178 increases by 1 (or incremented by 1). For each coordinate having a value of 0, the corresponding counter 178 decreases by 1 (or decremented by 1). By way of one particular example, if the data pattern of the feature vector to-be-stored was <1, 0, 1, 0>, then—for each one of the activated locations—the first counter 178A would add one to its total; the second counter 178B would subtract one from its total; the third counter 178C would add one to its total; and the fourth counter 178D would subtract one from its total. After numerous feature vectors have been stored into the SDM module 118, the stored content counters 178 of the hard locations nos. 1-7 might be as shown in FIG. 4.

The identification module 117 is also configured to provide a suggested identity of the character(s)-of-interest. In other words, the identification module 117 may identify (or provide a better estimation of) the character-of-interest to the user of the system 100. In some embodiments, the identification module 117 may use a feature vector to retrieve an output vector that is then used to provide the suggested identity. The identification operation is similar to the training operation discussed above. However, the SDM module 118 is typically already trained or modified in some manner before the system 100 is used to analyze markings on objects.

Again, the feature vector being applied to the SDM module 118 during the identification operation may be represented as the cross-hairs 185 in the address space 170. The location of the cross-hairs 185 is based on the vector address of the feature vector, which can be determined by the segmentation module 116. As before, the identification module 117 may determine the relative distance between the feature vector and the hard locations 172 (e.g., by calculating the Hamming distance or through other algorithms, such as Manhattan or Euclidean). The identification module 117 then compares the calculated relative distances to a predetermined distance value to identify the activated locations. Again, the hard locations nos. 1, 3, 4, and 6 in FIG. 4 may represent the activated locations. It should be noted that the predetermined distance value for storing feature vectors and the predetermined distance value for retrieving output vectors are not required to be the same. For example, storing a feature vector may only require a Hamming distance of 4, but retrieving an output vector may require a Hamming distance of 3.

In some embodiments, to provide the suggested identity of the character-of-interest, the stored content counters 178 of the activated locations are then summed-and-thresholded as indicated at reference numeral 184. More specifically, the counters 178A of the activated locations are combined (e.g., summed or added together); the counters 178B of the activated locations are combined; the counters 178C of the activated locations are combined; and the counters 178D of the activated locations are combined. The resulting vector may be referred to as a summed-content vector 187 that includes a set of values. As shown in FIG. 4, the exemplary summed-content vector from the summing operation is <2, 1, −3, 1>. The number of values in the set of values is equal to the number of coordinates in the feature vector.

According to one embodiment, each of the sums is then compared to a threshold to provide an output vector 186. For example, if the value in the summed-content vector 187 is greater than a threshold value of zero, a value of 1 is provided in the corresponding output vector 186. If the value in the summed-content vector 187 is less than a threshold value of zero, a value of 0 is provided in the corresponding output vector 186. If the value is equal to zero, values of 0 or 1 can be provided in the corresponding output vector 186. In the illustrated example, the output vector 186 has values of <1, 1, 0, 1>. In other embodiments, a threshold value other than zero may be used.

Accordingly, in some embodiments, the feature vector in the training and retrieval operations may facilitate identifying a select number of the hard locations 172 as activated locations in the address space 170 of the SDM module 118. The stored content counters of the activated locations may then be used to generate a single output vector 186. The output vector 186 is based on the stored content counters of the activated locations that, in turn, can be based on previously stored feature vectors.

In some embodiments, the output vector 186 may be converted into a binary image, such as the binary image 160, using a similar cell location and value standard as described above. More specifically, each coordinate in the output vector 186 having a value of 1 will correspond to a cell that is black and each coordinate having a value of 0 will correspond to a cell that is white. The binary image 160 may then be provided to the user through, for example, the user interface 122. In such embodiments, the suggested identity may include some noise. In other embodiments, the output vector 186 may undergo further analysis or processing to determine an ideal character that the output vector is closest to that does not include noise. The ideal character may then be provided to the user interface 122. Accordingly, the suggested identity shown to the user may or may not correspond to the ideal character.

Figure 6:
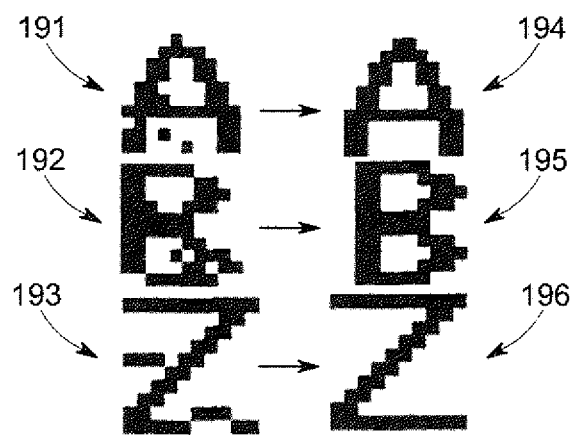
FIG. 6 illustrates exemplary binary images of characters-of-interest that may be identified by the system of FIG. 1.

FIG. 6 illustrates exemplary binary images 191-193 of characters-of-interest that may be identified by various embodiments described herein. As shown, the binary images 191-193 do not include ideal representations. For example, the physical markings corresponding to the binary images 191-193 may have been physically damaged (e.g., scratched, worn), or the physical markings may have collected dust or other material. Embodiments described herein are configured to analyze image data of the physical markings and provide output representations 194-196 that indicate the identity of the characters-of-interest.

Figure 5:
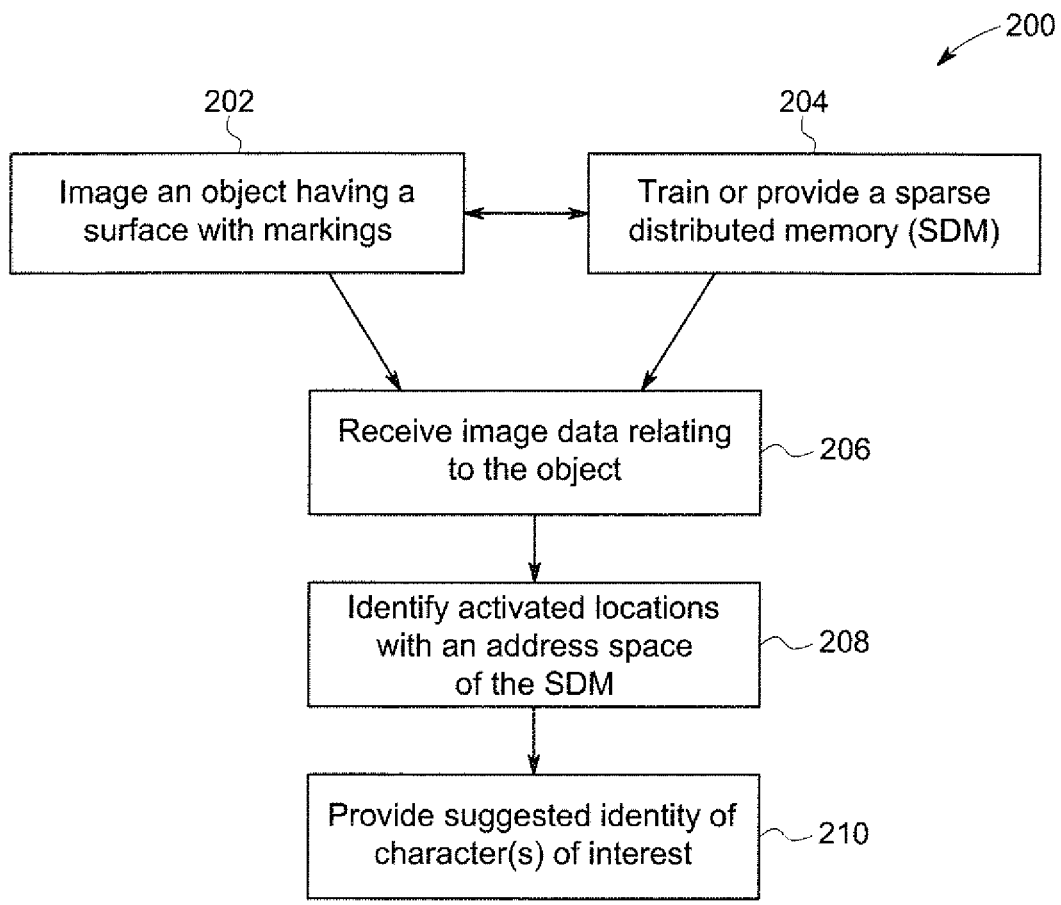
FIG. 5 is a flowchart illustrating a method of identifying characters from an object having physical markings.

FIG. 5 is a flowchart illustrating a method 200 of identifying characters from an object having physical markings. The method 200 may be implemented by the system 100. A non-transitory computer readable medium may also include instructions to command a processor to perform the method 200. The method 200 includes imaging at 202 an object having a surface with markings thereon. The markings may be physical markings. The imaging operation at 202 may include using an imager, such as the imager 104, or other camera system to acquire an image of the physical markings on the object. In an exemplary embodiment, the imager or camera system is part of a system or device that is dedicated almost exclusively to character-recognition and to communication of the suggested characters. However, in other embodiments, the system or device may be used for various applications. By way of one example only, the system or device may be a personal communication device, such as a smart phone, or a portable computer (e.g., laptop, tablet, and the like). The personal communication device or the portable computer can have a software application for character-recognition stored in the device or computer. The imager could be a camera system that is integrated with the device or computer. Alternatively, additional components for imaging could be removably attached to the device or computer.

Before or after the imaging operation at 202, the SDM can be trained or provided at 204. The SDM can have an address space with hard locations that are distributed within the address space. In one example, the SDM can be trained using the images acquired by the system as described above with respect to FIG. 4. Alternatively, previously-acquired image data may be received from a stored database. For instance, if the user desired to train the SDM in a particular manner, the user could request that the SDM be trained with feature vectors that are derived from physical markings found on a particular type of object. Objects of a particular type may be marked in a similar manner. For example, same-type objects may be marked in the same way (e.g., dot peened) and in the same manner (e.g., 5×7 matrix). The user could be even more particular and request feature vectors of objects that have been marked by one particular machine, because that machine may have A's (or other alphanumeric characters) that are unique to A's of other machines of the same type. The user may specify the request in other manners as well.

In other embodiments, the training operation at 204 may constitute receiving an SDM. More specifically, the training operation at 204 may include receiving an SDM that has been previously trained or modified in some manner. For example, the stored content counters of the hard locations in the trained SDM may already have particular values. As such, the time necessary to train the SDM by repeatedly storing feature vectors may be avoided. The SDM may be configured for a particular object. By way of one particular example only, an SDM may be trained for rotors that were manufactured in a particular year at one plant. It should be noted that the training operation at 204 may or may not be performed.

The method 200 may also include receiving at 206 image data that relates to the object having characters-of-interest. The image data may be received from the imager or other camera system immediately after acquisition of the image, or the image data can be received from a database. After receiving the image data, the image data may be analyzed to convert at least one of the characters-of-interest into a corresponding feature vector as described above.

With the SDM, the method 200 includes identifying at 208 activated locations within the address space by determining a relative distance between the feature vectors and the stored vector location addresses of the hard locations. As described above, non-limiting examples of the relative distance include the Hamming distance, the Manhattan distance, or the Euclidean distance. Regardless of the manner in calculating the relative distance, the activated locations may be determined by comparing the calculated relative distances to a predetermined distance value.

The method 200 also includes providing a suggested identity at 210 of the character(s)-of-interest based on the stored content counters of the activated locations as described above. The suggested identity may be generated from an output vector provided by the SDM. The suggested identity may be a character that includes some noise or an ideal character without any noise.

Figure 7:
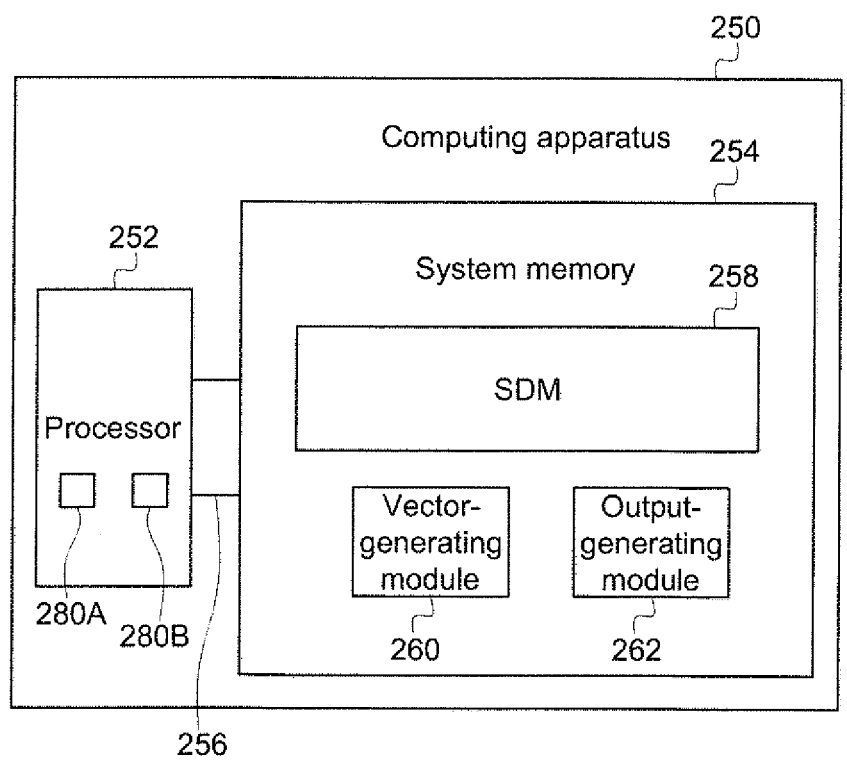
FIG. 7 is a schematic diagram of a computing apparatus formed in accordance with one embodiment.

FIG. 7 is a schematic diagram of a computing apparatus 250 formed in accordance with one embodiment. The various embodiments described herein may also be implemented as part of or include the computing apparatus 250. For example, the computing apparatus 250 may be part of or include the system 100 (FIG. 1). The computing apparatus 250 may include a processor (e.g., computer processing unit) 252 and a system memory 254. The system memory 254 has a sparse distributed memory (SDM) 258 as described herein. The processor 252 and the system memory 254 may be interconnected through a communication bus 256 or other communication line. Although not shown, the computing apparatus 250 may also include an input device, a display unit, and a communication interface that may be used to, for example, access a communication network and/or communicate with other systems/devices.

The system memory 254 may be any type of memory capable of storing data and/or instructions or programs. For example, the system memory 254 may include Random Access Memory (RAM) and Read Only Memory (ROM). The computing apparatus 250 may include additional computer data storage components (not shown), such as a hard disk drive or a removable storage drive (e.g., an optical disk drive, solid state disk drive (e.g., flash RAM), and the like). The storage components may include similar means for loading computer programs or other instructions into the processor 252.

The processor 252 executes a set of instructions that are stored in one or more storage elements or modules, in order to process data. The storage elements may also store data or other information as desired or needed. The storage element may be in the form of an information source or a physical memory element within a processing machine. The set of instructions may include various commands that instruct the computing apparatus 250 as a processing machine to perform specific operations such as the methods and processes of the various embodiments described herein. The set of instructions may be in the form of a software program, which may form part of a tangible, non-transitory computer readable medium or media. The software may be in various forms such as system software or application software. Further, the software may be in the form of a collection of separate programs or modules, a program module within a larger program, or a portion of a program module. The software also may include modular programming in the form of object-oriented programming. The processing of input data by the processing machine may be in response to operator commands, or in response to results of previous processing, or in response to a request made by another processing machine.

The processor 252 is shown as being a single component in FIG. 7. In some embodiments, the processor 252 has multiple processing elements. For example, the processor 252 may include multiple cores in which each core is capable of executing a thread for carrying out the operations described herein. However, in other embodiments, the computing apparatus 250 may include a plurality of the processors 252 that are located in the same device housing. Alternatively, the computing apparatus 250 may include a plurality of processors 252 in which one or more of the processors 252 are remotely located with respect to one another.

The computing apparatus 250 is configured to facilitate identifying a character-of-interest on a surface of an object. The computing apparatus 250 may include a vector-generating module 260 and an output-generating module 262. The vector-generating module 260 and the output-generating module 262 may be part of the system memory 254 or another storage device. The vector-generating module 260 is configured to obtain image data relating to an acquired image of an object. For example, the vector-generating module 260 may receive image data from an imager, such as the imager 104 (FIG. 1), or may receive image data from another source. The vector-generating module 260 is configured to generate a feature vector that is based on a character-of-interest in the acquired image. The vector-generating module 260 may operate in a similar manner as the segmentation module 116 (FIG. 1) described above. The feature vector has a vector address and a data pattern as described above with respect to the feature vector 161 (FIG. 3).

The output-generating module 262 is configured to generate an output vector 274 (FIG. 9) using the SDM 258. Similar to the SDM module 118 (FIG. 1) described above, the SDM 258 includes an address space having hard locations. Each of the hard locations includes a stored vector location address and stored content counters. The output-generating module 262 is configured to identify activated locations from the hard locations by determining relative distances between the vector address and the stored vector location addresses. The output-generating module 262 can also be configured to update the stored content counters of the activated locations. The output-generating module 262 is configured to combine the stored content counters of the activated locations to provide a summed-content vector. The output-generating module 262 is also configured to generate an output vector that is based on the summed-content vector. In some embodiments, the output-generating module 262 trains or updates the SDM 258 by storing data patterns in activated locations.

Figure 8:
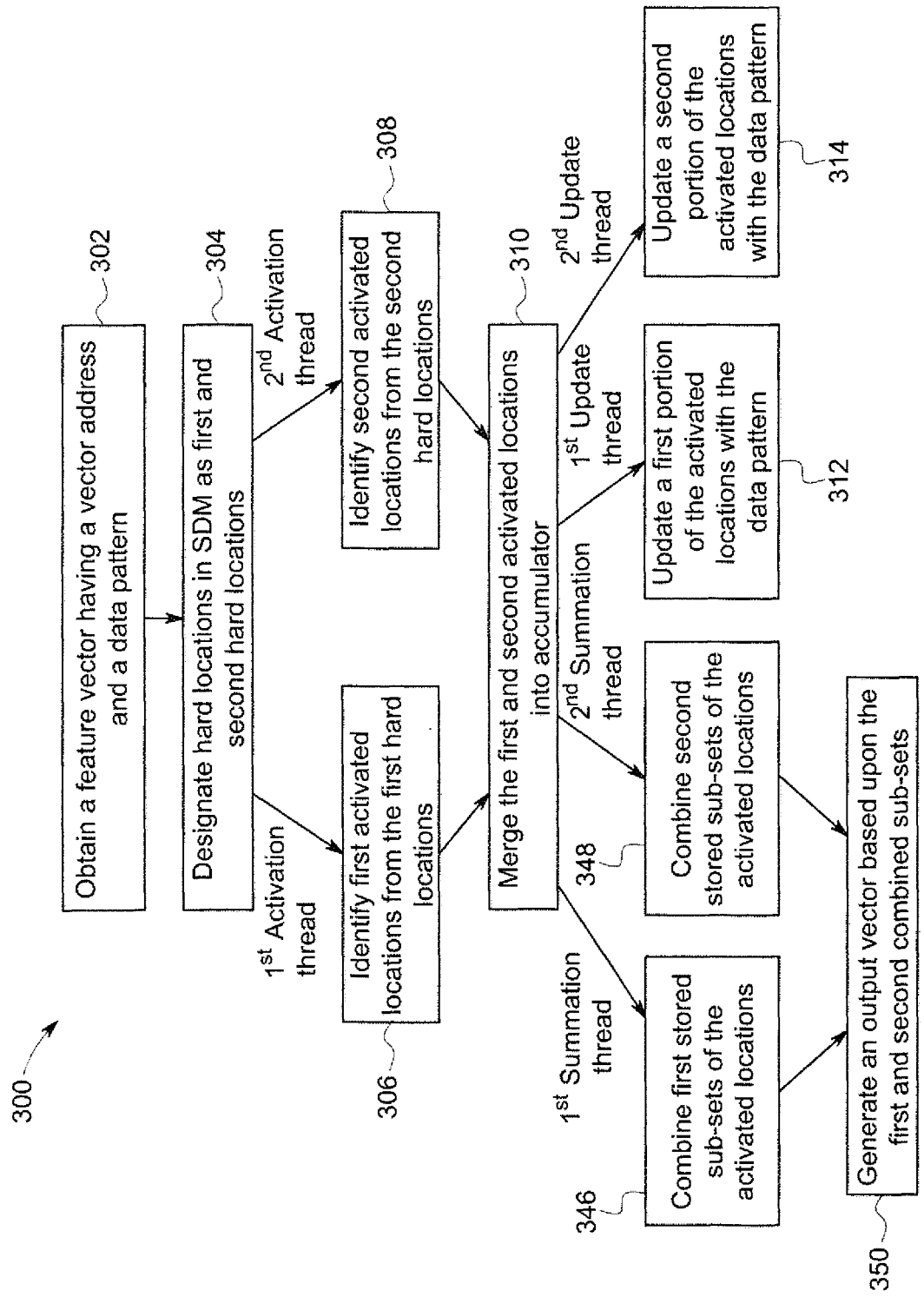
FIG. 8 is a flowchart illustrating a method of generating an output vector to identify a character-of-interest.

FIG. 8 is a flowchart illustrating a method 300 of generating an output vector to identify a character-of-interest. As described above, various embodiments herein may use parallel processing. For example, each of a summed-content vector 272 (FIG. 9) and an output vector 274 (FIG. 9) may be at least partially determined through parallel processing. Parallel processing may also be used to calculate the relative distances (e.g., Hamming distances, etc.) and update the SDM 258 by storing data patterns to the stored content counters. By way of one example only, the processor 252 may include multiple processing elements or cores 280A, 280B (FIG. 7). Although FIG. 7 only illustrates two processing elements 280A, 280B, more than two processing elements 280 may be used in other embodiments. Furthermore, additional processors 252 having one or more processing elements may be used.

For some operations, each processing element 280 may execute a corresponding thread that is run in parallel with respect to other threads of the other processing elements. Each thread may read and/or write to a respective portion of the system memory 254 or SDM 258. In some cases, the threads do not have access to the same portion of the system memory 254 (e.g., the threads cannot write to the other portions). Thus, for some operations, each one of the multiple threads may read and/or write to only one portion of the system memory 254 thereby minimizing the use of mutual exclusion guards like mutexes or other methods of blocking access to shared resources.

As shown in FIG. 8, the method 300 includes obtaining at 302 a feature vector having a vector address and a data pattern. The feature vector may be based on a character-of-interest in an acquired image. For example, the feature vector may be obtained by generating the feature vector using the computing apparatus 250 or the system 100 (FIG. 1), or the feature vector may be obtained by receiving the feature vector from a remote system or database. In some parallel processing embodiments, the method 300 may also include designating at 304 the hard locations of the SDM 258 as a first set of hard locations (or "first hard locations") and a second set hard locations (or "second hard locations").

The method 300 also includes identifying at 306 and 308 first and second activated locations from the first and second hard locations. The first and second hard locations include first and second stored vector location addresses, respectively, and also first and second stored content counters, respectively. The output-generating module 262 may use a first activation thread to calculate a relative distance (e.g., Hamming distance, etc.) between the location addresses of the first hard locations and the vector address of the feature vector. The first hard locations that are associated with relative distances within a predetermined distance value may be identified as first activated locations. The first activated locations may be placed into a temporary accumulator.

As shown at 308, the output-generating module 262 may use a second activation thread to calculate a relative distance between the second hard locations and the vector address of the feature vector. The first and second activation threads may be run in parallel. The second hard locations that are associated with relative distances within a predetermined distance value may be identified as second activated locations. The second activated locations may be placed into a temporary accumulator. The results from the first and second activation threads may be merged into a final accumulator at 310. The final accumulator may be protected by a mutex or other guards. Accordingly, the final accumulator can include the hard locations that are determined to be within a relative distance from the vector address.

As another example, parallel processing may be used to update the stored content counters of the activated locations. In particular embodiments, the updating occurs before the combining described below. However, in other embodiments, the updating may occur after the combining or not at all. For example, after the first and second activated locations are merged into the final accumulator, a first update thread may be executed to update at 312 a first portion of the activated locations with the data pattern of the feature vector. For instance, the data pattern of the feature vector may be stored into the stored content counters of the activated locations by incrementing or decrementing the counters. Similarly, a second update thread may be executed to update at 314 a second portion of the activated locations with the data pattern of the feature vector. The first and second update threads may be run in parallel.

By way of example, if a total of the first and second activated locations described above includes 50,000 activated locations, the first update thread may operate on 25,000 activated locations in the accumulator. The second update thread may operate on the remaining 25,000 activated locations in the accumulator. To be clear, the 25,000 activated locations operated on at 312 may include (a) only first activated locations identified at 306; (b) only second activated locations identified at 308; or (c) a mixture of the first and second activated locations that were identified at 306, 308. The remaining 25,000 activated locations operated on at 314 may also include activated locations from (a), (b), or (c). However, the remaining 25,000 activated locations are different than the other 25,000 activated locations.

In some embodiments, after the above updating operations at 312 and 314, the results of the first and second update threads are not required to be merged. As such, murexes are not needed to guard a final accumulator. Moreover, protection is not needed for any hashmaps because the hashmaps only need to be protected if the underlying structures of the hashmaps are changed.

Parallel processing may also be used to combine or sum the stored content counters. The stored content counters of the hard locations and, thus, the activated locations may include first and second stored sub-sets of counters. For example, if each activated location has 10,000 counters, a first summation thread can operate to combine at 346 the first 5,000 counters (i.e., the first stored sub-set) of each of the activated locations and a second summation thread may operate to combine at 348 the remaining 5,000 counters (i.e., the second stored sub-set) of each of the activated locations. The values from the combined counters may be placed into a corresponding accumulator and converted into the summed-content vector 272. The method 300 may also include generating at 350 an output vector 274 (FIG. 9) that is based on the first and second combined sub-sets.

Figure 9:
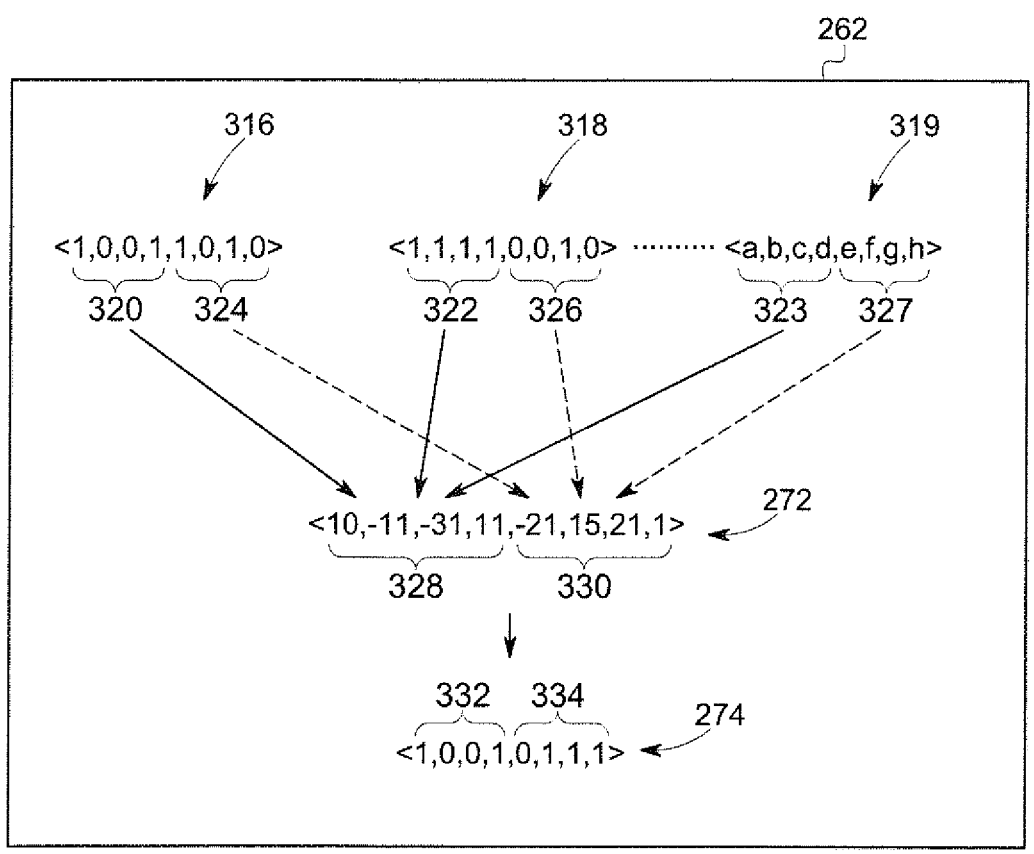
FIG. 9 illustrates one parallel processing operation that may be performed by various embodiments.

For instance, FIG. 9 illustrates the combining operations at 346, 348 in greater detail that may be at least partially performed by the output-generating module 262. As shown, three activated locations 316, 318, 319 include first stored sub-sets 320, 322, 323, respectively, and second stored sub-sets 324, 326, 327, respectively. FIG. 9 shows only three activated locations 316, 318, 319 for illustrative purposes, but many more may be used. Likewise, only eight counters in each of the activated locations 316, 318, 319 are shown, but it is understood that the activated locations may include more counters.

The output-generating module 262 may be used to provide a summed-content vector 272. The first summation thread may combine the first stored sub-sets 320, 322, 323, and the second summation thread may combine the second stored sub-sets 324, 326, 327. The first summation thread is indicated by the solid arrows and the second summation thread is indicated by the dashed arrows. As shown, the summed-content vector 272 includes first and second combined sub-sets 328, 330, respectively, each of which includes a number of values. The values of the first combined sub-set 328 are provided by the first summation thread, and the values of the second combined sub-set 330 are provided by the second summation thread. More specifically, the summed-content vector 272 is determined by multiple threads and based on the stored content counters of the activated locations. The summed-content vector 272 may then be used to generate the output vector 274 that includes a set of coordinates comprising first and second output sub-sets 332, 334. Although not shown, the first and second output sub-sets 332, 334 can be determined by separate threads if desired. Accordingly, the first and second output sub-sets 332, 334 are based on the first and second combined sub-sets 328, 330, respectively, that are, in turn, based on different stored sub-sets of the stored content counters.

In those embodiments that use multiple summation threads, mutexes or other guards may not be required because each summation thread may be restricted to a certain stored sub-set of the stored content counters. As such, a race condition may be avoided because separate threads cannot change the same counters.

In the illustrated embodiment, the method 300 (FIG. 8) includes three places where parallel processing can be used. However, embodiments are not required to use each of these examples of parallel processing. For instance, some embodiments may only use parallel processing for determining whether hard locations are activated locations. In addition, although the parallel processing examples described above include only two threads, more than two threads can be used (e.g., three threads, four threads, et seq) in the different examples. In particular embodiments, each thread is executed by a separate processing element (e.g., core).

In some embodiments, the system 100 or the computing apparatus 250 stores the vector addresses and the location addresses as a long vector. Each dimension (i.e., each coordinate) of the vector address or the location address may require one byte (8 bits) of storage. As an example, if the value of the coordinate was 1, the coordinate may be stored as [0, 0, 0, 0, 0, 0, 0, 1] and if the coordinate value was 0, the coordinate may be stored as [0, 0, 0, 0, 0, 0, 0, 0]. As shown, each coordinate is stored with seven extraneous bits (i.e., the first seven 0's). Thus, 32 bits in a Boolean array may represent only four dimensions/coordinates of the vector address (or the location address). When the relative distance is determined (e.g., when the Hamming distance is calculated), the processor must run an XOR operation on all 32 bits to determine only four distance values. In such embodiments, the extraneous bits may have a negative affect on the speed of the calculations.

Accordingly, in other embodiments, the system 100 or the computing apparatus 250 may store the coordinates for the vector addresses (or the location addresses) in an integer array. In the integer array, each dimension/coordinate may be represented by one bit instead of one byte. Thus, 32 bits in the integer array may represent 32 dimensions/coordinates of the vector address (or the location address). When the relative distance is determined, the processor runs an XOR operation on all 32 bits to determine 32 different distance values. In such embodiments, calculating the relative distances may be faster than in other embodiments where the coordinates are stored with extraneous bits.

However, the above instances for storing coordinates of vector addresses and location addresses are only exemplary. Embodiments described herein may be implemented using various storage methods and, as such, should not be limited to these examples.

At least one technical effect of some embodiments is the suggested identity of a character-of-interest using sparse distributed memory. In some embodiments, the character-of-interest may have been damaged, dirtied, or are otherwise rendered more difficult to read. The suggested identity may be displayed to a user or otherwise communicated to the user. Other technical effects for some embodiments include training an SDM for a system or device that is subsequently used to provide suggested identities of the characters-of-interest. Another technical effect may be the reduced amount of time necessary for identifying a character-of-interest or training the SDM.

As used herein, the terms "computing apparatus," "computer," or "module" may include any processor-based or microprocessor-based system including systems using microcontrollers, reduced instruction set computers (RISC), application specific integrated circuits (ASICs), field-programmable gate arrays (FPGAs), graphical processing units (GPUs), logic circuits, and any other circuit or processor capable of executing the functions described herein. The above examples are exemplary only, and are thus not intended to limit in any way the definition and/or meaning of the terms "computing apparatus," "computer," or "module."

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from their scope. While the dimensions and types of materials described herein are intended to define the parameters of the various embodiments, the embodiments are by no means limiting and are exemplary embodiments. Many other embodiments will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose the various embodiments, including the best mode, and also to enable any person skilled in the art to practice the various embodiments, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed is:

1. A non-transitory computer readable medium configured to generate an output vector for identifying a character-of-interest using a processor and a sparse distributed memory (SDM) module, the SDM module including an address space having hard locations, the hard locations having a stored vector location address and stored content counters, the computer readable medium including instructions to command the processor to:
    obtain a feature vector having a vector address, the feature vector being based on a character-of-interest in an acquired image;
    identify activated locations from the hard locations by determining relative distances between the vector address and the stored vector location addresses, the stored content counters of the activated locations including first and second stored sub-sets of counters;
    combine the counters of the first stored sub-sets of the activated locations using a first summation thread to provide a first combined sub-set of values;
    combine the counters of the second stored sub-sets of the activated locations using a second summation thread to provide a second combined sub-set of values, wherein the first and second summation threads are run in parallel;
    generate an output vector that includes a set of coordinates comprising first and second output sub-sets, the first and second output sub-sets being based on the first and second combined sub-sets, respectively; and
    convert the output vector into an output image.

2. The computer readable medium of claim 1, wherein the hard locations include first and second hard locations having first and second stored vector location addresses, respectively, and wherein the instructions to identify the activated locations includes instructions to:
    determine the relative distances between the vector address and the first stored vector location addresses using a first activation thread to identify first activated locations; and
    determine relative distances between the vector address and the second stored vector location addresses using a second activation thread to identify second activated locations, wherein the first and second activation threads are run in parallel, the first and second activation threads being executed by different processing elements.

3. The computer readable medium of claim 2, wherein the feature vector includes a data pattern and the instructions include instructions to:
    store the data pattern in the stored content counters of the first activated locations using a first update thread; and
    store the data pattern in the stored content counters of the second activated locations using a second update thread, the first and second update threads being executed by different processing elements.

4. The computer readable medium of claim 1, wherein the feature vector includes a data pattern and the instructions include instructions to:
    identify some of the activated locations as first activated locations and identify some of the activated locations as second activated locations;

store the data pattern in the stored content counters of the first activated locations using a first update thread; and store the data pattern in the stored content counters of the second activated locations using a second update thread, the first and second update threads being executed by different processing elements.

5. The computer readable medium of claim 1, wherein the instructions include instructions to provide a suggested identity of the character-of-interest based on the output vector.

6. The computer readable medium of claim 1, wherein the output image suggests an identity of the character-of-interest.

7. The computer readable medium of claim 1, wherein the instructions include instructions to process image data of the acquired image having an object with characters on a surface of the object, wherein processing the image data includes isolating the character-of-interest from among the characters and converting the character-of-interest into the feature vector, the feature vector having the vector address.

8. The computer readable medium of claim 1, wherein the vector address is also a data pattern, the instructions including instructions to store the data pattern in the stored content counters.

9. A method of generating an output vector to identify a character-of-interest using different first and second processing elements and a sparse distributed memory (SDM) module, the SDM module including an address space having hard locations, the hard locations including a stored vector location address and stored content counters, the method comprising:

obtaining a feature vector having a vector address, the feature vector being based on a character-of-interest in an acquired image;

identifying activated locations from the hard locations by determining relative distances between the vector address and the stored vector location addresses, the stored content counters of the activated locations including first and second stored sub-sets of counters;

combining the counters of the first stored sub-sets of the activated locations using a first summation thread to provide a first combined sub-set of values;

combining the counters of the second stored sub-sets of the activated locations using a second summation thread to provide a second combined sub-set of values, wherein the first and second summation threads are run in parallel, the first summation thread being executed by the first processing element, the second summation thread being executed by the second processing element;

generating an output vector that includes a set of coordinates comprising first and second output sub-sets, the first and second output sub-sets being based on the first and second combined sub-sets, respectively; and converting the output vector to an output image that suggests an identity of the character-of-interest.

10. The method of claim 9, further comprising:

receiving image data of the acquired image relating to an object having a surface with characters thereon, the characters including the character-of-interest; and analyzing the image data to convert the character-of-interest in the image data into the feature vector having the vector address.

11. The method of claim 10, further comprising providing a suggested identity of a character-of-interest based on the output vector.

12. The method of claim 9, wherein the hard locations include first and second hard locations having first and second stored vector location addresses, respectively, and further comprising:

using a first activation thread to determine the relative distances between the vector address and the first stored vector location addresses; and using a second activation thread to determine the relative distances between the vector address and the second stored vector location addresses, wherein the first and second activation threads are run in parallel, the first and second activation threads being executed by different processing elements.

13. The method of claim 9, wherein the first and second processing elements are different processors or are different cores of a multi-core processor.

14. The method of claim 9, wherein the feature vector and the stored vector location address of each hard location has an equal number of coordinates.

* * * * *